United States Patent
Townsend (10) Patent No.: US 10,748,274 B2
(45) Date of Patent: Aug. 18, 2020

(54) DETECTING PORTIONS OF INTEREST IN IMAGES

(71) Applicant: FUJITSU LIMITED, Kawasaki-shi, Kanagawa (JP)

(72) Inventor: Joseph Townsend, High Wycombe (GB)

(73) Assignee: FUJITSU LIMITED, Kawasaki (JP)

( * ) Notice: Subject to any disclaimer, the term of this patent is extended or adjusted under 35 U.S.C. 154(b) by 261 days.

(21) Appl. No.: 15/901,551

(22) Filed: Feb. 21, 2018

(65) Prior Publication Data
US 2018/0315180 A1    Nov. 1, 2018

(30) Foreign Application Priority Data

Apr. 28, 2017   (EP) .................................... 17168804

(51) Int. Cl.
| | | |
|---|---|---|
| *G06T 7/00* | (2017.01) | |
| *G06K 9/32* | (2006.01) | |
| *G06K 9/62* | (2006.01) | |
| *G01N 29/06* | (2006.01) | |

(52) U.S. Cl.
CPC ........... *G06T 7/0008* (2013.01); *G01N 29/06* (2013.01); *G06K 9/3233* (2013.01); *G06K 9/6218* (2013.01); *G06T 2207/10024* (2013.01); *G06T 2207/10132* (2013.01)

(58) Field of Classification Search
CPC . G06T 2207/10132; G06T 2207/10024; G06T 7/0008; G01N 29/06; G06K 9/6218; G06K 9/3233
See application file for complete search history.

(56) References Cited

U.S. PATENT DOCUMENTS

| | | | | |
|---|---|---|---|---|
| 4,339,944 | A | 7/1982 | Abts et al. | |
| 6,983,065 | B1 * | 1/2006 | Akgul ................. | G06K 9/4619 348/125 |
| 8,050,486 | B2 * | 11/2011 | Walton ................. | B29C 70/32 356/237.3 |
| 2003/0009470 | A1 * | 1/2003 | Leary ................. | G06K 9/6218 |

(Continued)

FOREIGN PATENT DOCUMENTS

| | | |
|---|---|---|
| JP | 2015-153163 | 8/2015 |
| WO | WO 99/28853 | 6/1999 |
| WO | WO 2016/195539 A1 | 12/2016 |

OTHER PUBLICATIONS

Extended European Search Report dated Dec. 22, 2017 in corresponding European Patent Application No. 17168804.7.

*Primary Examiner* — Yon J Couso
(74) *Attorney, Agent, or Firm* — Staas & Halsey LLP (57) ABSTRACT

A computer-implemented method of automatically locating a portion of interest in image or matrix data derived from an item under consideration includes: identifying parts of the image or matrix data that satisfy a preset threshold as objects which are possibly parts of the portion of the interest; applying at least one preselected filter to the data corresponding to the objects to find a set of objects consisting of the objects most likely to be part of the portion of interest; sorting the objects of the set into clusters according to a predefined criterion; and using a known characteristic of the portion of interest to identify which one of the clusters corresponds to the portion of interest.

21 Claims, 7 Drawing Sheets

The original image of the scan.

Thresholded image.

(56) References Cited

U.S. PATENT DOCUMENTS

| | | | |
|---|---|---|---|
| 2010/0220910 A1* | 9/2010 | Kaucic | G06T 7/001 382/131 |
| 2011/0110575 A1 | 5/2011 | Banumathi et al. | |
| 2016/0171314 A1 | 6/2016 | Shao | |
| 2017/0334156 A1* | 11/2017 | Jha | B29D 23/001 |

* cited by examiner

DETECTING PORTIONS OF INTEREST IN IMAGES

CROSS-REFERENCE TO RELATED APPLICATIONS

This application claims the benefit of European Patent Application No. 17168804.7, filed Apr. 28, 2017, in the European Intellectual Property Office, the disclosure of which is incorporated herein by reference.

BACKGROUND

1. Field

Embodiments relate to the automatic detection of portions of interest in image data.

2. Description of the Related Art

Automatic detection of a portion of interest in an image is advantageous in many different technical fields. One such field is ultrasonic non-destructive testing (NDT) of items.

Ultrasonic NDT is a non-invasive technique that is used for determining the integrity of materials, such as fiberglass used in manufacturing, or structures, and enables the detection of internal defects in the test object. In this technique, one or more ultrasound probes emit sound waves that propagate inside the object and receive the echoes resulting from interactions with the internal structures. The distance of the reflector material can be accurately estimated based on the speed of the sound wave.

Ultrasonic scans are stored as numerical values in a matrix which is then translated into an image for visual inspection, for example according to a heat map in which blue represents low values and red represent high values. Signals caused by reflections due to flaws, such as discontinuities, wrinkles, trapped objects, air pockets, etc., can be identified in the scans. This technique is widely used in industry as part of manufacturing quality control processes. Currently the detection is a manual process, involving a thorough visual inspection of each section of the scan. Depending on the dimensions of the test object, a trained operator can spend several hours looking through visualizations of the scans in order to identify regions of the structure that may have defects and require physical inspection. The operator uses visual cues, such as structure curvatures or discontinuities, to flag potential defects. This is done through interactive visualization of the raw scan data, which enables adjustment of saturation thresholds, zooming, etc. Although the operators are highly-trained, the inspection is not guaranteed to have full coverage of all defects due to noise in the raw data, resulting from the propagation of echoes, and/or issues with the visualization.

Such NDT scans detect multiple boundary or 'wall' structures of an item being tested: the front wall, the back wall, and an 'echo' of the back wall. Identifying the front and back wall is important because the space between these walls is where the search for defects must take place; any other space in the image is noise and is ignored. The front wall is simple to identify because it will always be presented at the top of the image of a scan, but automatically identifying the back wall is more difficult, as the locations of the back wall and its echo may vary and data from either wall or the echo may be missing.

Automatically detecting portions of interest may also be problematic in other technical areas. For example, identifying road lane markings in an image automatically may be difficult if parts of the lane marking are obscured or missing.

It is desirable to provide a further improved method of automatically locating portions of interest in image data.

SUMMARY

Additional aspects and/or advantages will be set forth in part in the description which follows and, in part, will be apparent from the description, or may be learned by practice of the invention.

According to an embodiment of a first aspect there is provided a computer-implemented method of automatically locating a portion of interest in image or matrix data derived from an item under consideration, which method comprises: identifying parts of the image or matrix data that satisfy a preset threshold as objects which are possibly parts of the portion of the interest; applying at least one preselected filter to the data corresponding to the objects to find a set of objects consisting of the objects most likely to be part of the portion of interest; sorting the objects of the set into clusters according to a predefined criterion; and using a known characteristic of the portion of interest to identify which one of the clusters corresponds to the portion of interest.

Embodiments enable a portion of interest, such as specific layer, boundary or wall structure in image or matrix data, to be accurately and automatically identified regardless of the presence of discontinuities in those structures, the width of those discontinuities or the space between them. By identifying the portion of interest, discontinuities within it may then be identified.

By automating the initial part of the inspection process in this way, quality control engineers/technicians can complete their inspections in more efficient ways, taking less inspection time per test object and hence reducing the overall human effort and costs.

Embodiments are independent of any sampling or patching process that may be involved in processing the data.

A method of an embodiment may further comprise, in the case of matrix data, generating an image from the matrix data excluding data of at least one cluster not identified as the portion of interest.

A method of an embodiment may further comprise, in the case of image data, removing from the image the image data of at least one cluster not identified as the portion of interest.

According to an embodiment of a second aspect there is provided a defect detection method for use in detecting a defect in an item under consideration, in which method an image of, or derived from, the item is analyzed to identify such a defect, where the image to be analyzed comprises image data in which a portion of interest has been automatically located in accordance with a method embodying the first aspect. Such a defect detection method may, for example, comprise identifying as a site of a potential defect a location of a gap in the data forming the cluster identified as the portion of interest.

According to an embodiment of a third aspect there is provided use of a method in accordance with the second aspect to determine at least one of: the structural integrity of material forming at least part of the item; and flaws in material forming at least part of the item.

According to an embodiment of a fourth aspect there is provided a computer program which, when run on a computer, causes that computer to carry out a method embodying the first or second aspect.

According to an embodiment of a fifth aspect there is provided a data processing apparatus to locate a portion of interest in image or matrix data derived from an item under consideration, which apparatus comprises: a part identifier to identify parts of the image or matrix data that satisfy a preset threshold as objects which are possibly parts of the portion of the interest; at least one filter to filter the data corresponding to the objects to find a set of objects consisting of the objects most likely to be part of the portion of interest; a sorter to sort the objects of the set into clusters according to a predefined criterion; and a cluster identifier to use a known characteristic of the portion of interest to identify which one of the clusters corresponds to the portion of interest.

The apparatus may further comprise a gap identifier to identify as a site of a potential defect a location of a gap in the data forming the cluster identified as the portion of interest.

For image data, in embodiments of the first to fifth aspects the preset threshold may comprise a pixel value for at least one color, and pixel data of the image which exceed the pixel value are identified as objects.

In embodiments of the first to fifth aspects the portion of interest may be a layer representing or forming part of the item. In this case the preselected filter may filter out objects having a major axis in a direction perpendicular to an expected orientation of the layer. The predefined criterion for sorting objects may in this case be position in the direction perpendicular to the expected orientation of the layer.

In embodiments of the first to fifth aspects, the image or matrix data may be derived from ultrasound scan data of the item under consideration.

In embodiments of the first to fifth aspects the item under consideration may be at least one of: a manufactured item; and an item used in manufacture.

BRIEF DESCRIPTION OF THE DRAWINGS

These and/or other aspects and advantages will become apparent and more readily appreciated from the following description of the embodiments, taken in conjunction with the accompanying drawings of which:

Reference will now be made, by way of example, to the accompanying drawings, in which:

FIGS. 5(a) to 5(j) are diagrams for use in explaining the application of FIG. 3.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

A method of automatically locating a portion of interest in image or matrix data derived from an item under consideration according to an embodiment will now be explained with reference to the flowchart of FIG. 1(a). The portion of interest may, for example, be a data portion representing or corresponding to a specific physical layer, boundary or wall structure, or a feature delineating different regions of an image.

In this embodiment the method comprises, at step S1, identifying parts of the image or matrix data that satisfy a preset threshold as objects which are possibly parts of the portion of the interest. For example, for back wall detection in ultrasonic NDT, the threshold may be set based on the color of interest (e.g. red) in the image data, and other color thresholds (e.g. blue and green) may be set relative to this. This same principle may be applied to any color model, e.g. grayscale or CMYK, and with any conditions on the colors in the model. Alternatively or additionally, a threshold may be applied to the raw scan matrix data before it is converted into an image.

At step S2 at least one preselected filter is applied to the data corresponding to the objects to find a set of objects consisting of the objects most likely to be part of the portion of interest. For example, objects having a bounding box (i.e. the smallest rectangle or square which encloses all points in an object) with a major axis which is perpendicular to the expected orientation of the portion of interest may be discarded. In the context of the present specification, an object is considered 'horizontal' if the width of its bounding box is greater than its height, as opposed to the object itself being horizontal. Similarly, an object is considered 'vertical' if the height of its bounding box is greater than its width, as opposed to the object itself being vertical.

At step S3 the objects of the set are sorted into clusters according to a predefined criterion. For example, objects may be clustered according to their position on a defined 'clustering axis', i.e. an axis perpendicular to the bounding boxes of the objects in the set. Clustering algorithms used in embodiments do not require the clustering axis to be preselected; objects may be clustered depending on position relative to all other objects in the specified axis (whether in x, y, z space, attribute space, etc.).

At step S4 a known characteristic of the portion of interest is used to identify which one of the clusters corresponds to the portion of interest. For example, in ultrasonic NDT, if objects are clustered into three stacked clusters, it may be assumed that the back wall of the item under test corresponds to the middle cluster, and the front wall and back wall echoes correspond to the top and bottom clusters respectively.

Such a method enables detection of any number of portions of interest in an image, for example walls, layers and other boundaries in an item under consideration, even if those portions contain discontinuities/gaps, and regardless of their size or the space between them. The terms 'discontinuity', 'gap' and 'missing data' are used interchangeably henceforth.

To assist in the detection of a defect in the portion of interest identified using steps S1 to S4, in step S5 a location of a gap in the data forming the cluster identified as the portion of interest is identified as a site of a potential defect. For example, gaps in the back wall of an item undergoing testing may be identified as ranges in the axis parallel to the wall's bounding box (usually x-axis) which do not contain any part of any back wall object.

All operational parameters may be preset during manufacture or separately for each operation; either manually or automatically according to a set of heuristics or as the result of some machine learning process.

After the portion of interest is identified, the portion of interest in the image may be visually analyzed by an operator to identify one or more defects in the item under test. If a defect is identified in the analysis, in order to meet quality standards the item under test may be discarded or may be sent for repair, depending on the nature and severity of the defect. This may be done without physical inspection of the item by the same or another operator, if the nature and severity of the defect is readily apparent from the visual analysis.

Figure 1A:
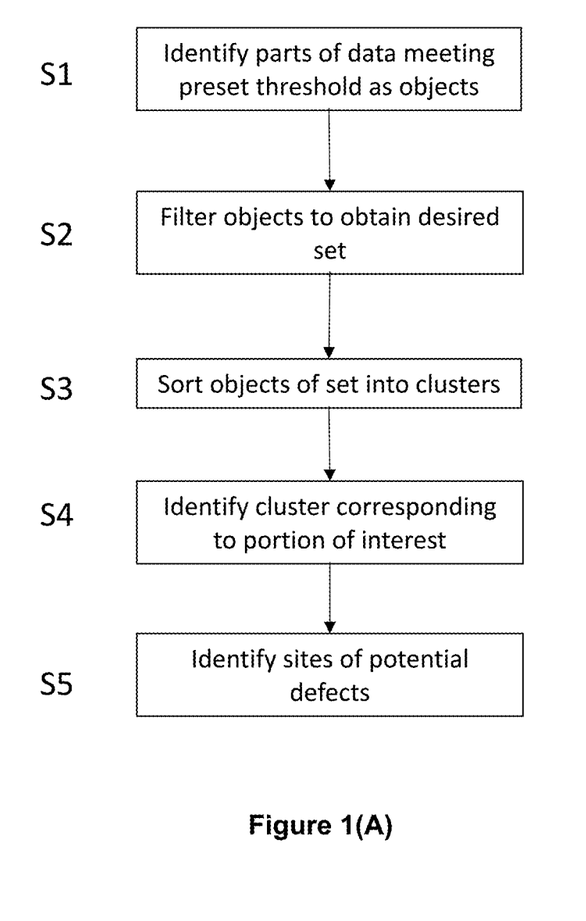
FIG. 1(A) is a flowchart of a method according to an embodiment.
Figure 1B:
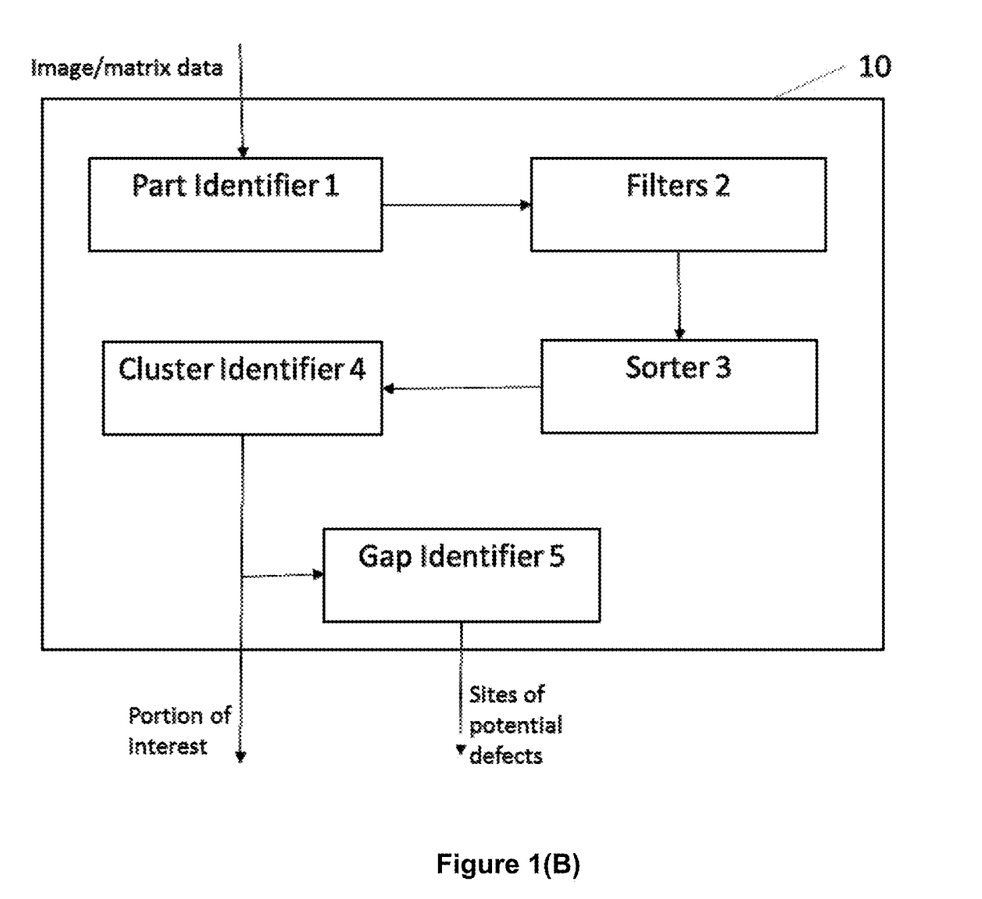
FIG. 1(B) is a diagram of apparatus according to an embodiment.

The method of FIG. 1(a) may be carried out using data processing apparatus 10 as shown in FIG. 1(b). Data processing apparatus 10 comprises a part identifier 1, filters 2, a sorter 3, a cluster identifier 4 and a gap identifier 5. Part identifier 1 is configured to identify parts of the image or matrix data that satisfy the preset threshold as objects which are possibly parts of the portion of the interest. Filters 2 are configured to filter the data corresponding to the objects to find a set of objects consisting of the objects most likely to be part of the portion of interest. Sorter 3 is configured to sort the objects of the set into clusters according to the predefined criterion. Cluster identifier 4 is configured to use the known characteristic of the portion of interest to identify which one of the clusters corresponds to the portion of interest. Gap identifier 5 is configured to identify a location of a gap in the data forming the cluster as the portion of interest as a site of a potential defect.

Figure 1C:
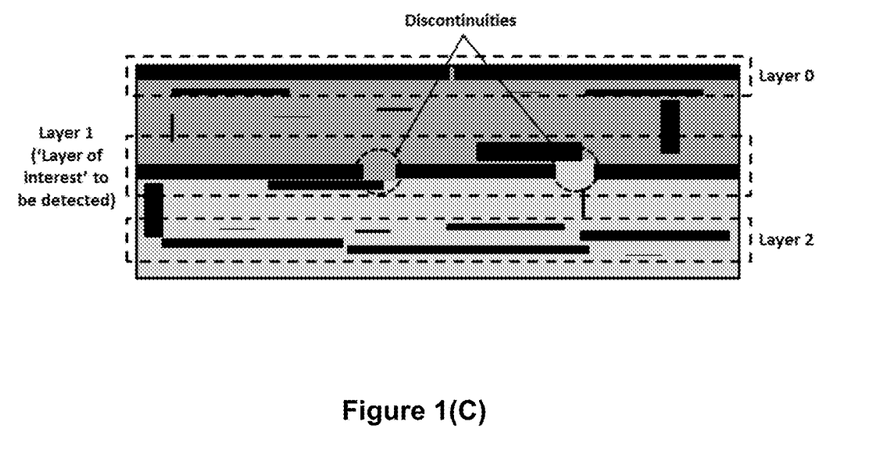
FIG. 1(C) is a diagram depicting image data derived from an item under consideration.

There is no restriction on what may constitute a portion of interest in image or matrix data, but by way of example only FIG. 1(c) shows an image derived from an item (for example, by ultrasound scanning) which shows multiple layers in which the portion of interest is a 'layer of interest', layer 1, between additional layers, layer 0 and layer 2. Discontinuities in the image data of layer 1 may indicate the location of defects in the structure represented by layer 1. For example, if the image were derived from ultrasound scanning of an item, layer 1, the portion of interest, would correspond to the back wall of the item, layer 0 would correspond to the front wall of the item, and layer 2 would correspond to the back wall echoes.

An embodiment will now be described with reference to FIGS. 2(a) to 2(i) in which the image of FIG. 1(c) is processed in order to locate the layer of interest and identify any potential defects in the structure represented by that layer.

Figure 2A:
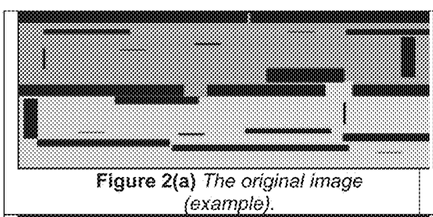
FIGS. 2(a) to 2(i) are diagrams for use in explaining a method according to an embodiment.

FIG. 2(a) shows the image of FIG. 1(c) at the outset of the process. Firstly the image data is assessed against a preset threshold. Each pixel, or set of connected pixels, satisfying the threshold is identified as an object which is possibly part of the layer of the interest. In this example the threshold is multi-dimensional, that is the threshold specifies a condition or set of conditions on each value in the image's color model (for example, grayscale, RGB, CMYK, etc.). For example, for back wall detection, a three-dimensional threshold [a,b,c] may be set such that pixels must satisfy $R>a$, $G<(R-b)$, $B<(G-c)$, but any conditions on any colors in any color model may be specified. Alternatively or additionally, a threshold may first be applied to the raw data matrix before conversion to image form. For example, for a two-dimensional matrix $M(i,j)$, the threshold may require that $M(i,j)>a$, or that $b>M(i,j)>a$, etc.

Thresholds may be preset during manufacture or separately for each operation; either manually or automatically according to a set of heuristics or as the result of some machine learning process.

Figure 2B:
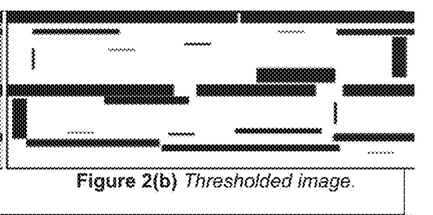

Pixels satisfying the threshold are all then assigned one value, while pixels which do not satisfy the threshold are all assigned another value. FIG. 2(b) shows the resulting binary image in which pixels satisfying the threshold are black and those which do not are white (an inversion of these color assignments, or indeed any other pair of colors, may be used instead).

The contour (i.e. the set of all points on the perimeter of an object) and area of each object in the image are then found, for example by using the 'findContours' and 'contourArea' functions of the OpenCV2 python library.

Identified objects are then filtered to find a set of objects consisting of the objects most likely to be part of the layer of interest. For example the objects may be filtered according to any combination of the filter criteria (1) to (4) listed below, and in any order of priority. The selection of all parameters and options described may be preset during manufacture or separately for each operation; either manually or automatically according to a set of heuristics or as the result of some machine learning process.

Figure 2C:
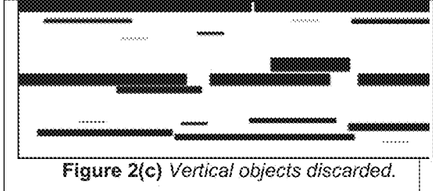

Filter criterion (1): Objects parallel to the chosen clustering axis (e.g. x or y) with respect to the bounding boxes of those objects are discarded. FIG. 2(c) shows the result on the image of applying this criterion to vertical objects.

Traditionally, bounding boxes do not have to be drawn such that they are parallel to an axis, i.e. they may be the smallest rectangle or square enclosing an object regardless of the box's orientation. In such a case, an image containing layers with bounding boxes of any orientation could still be processed in accordance with this embodiment by classifying a bounding box as 'parallel' to the axis against which its angle of orientation is smallest.

Alternatively, if the bounding boxes of all objects are parallel to each other, the image or raw scan matrix could be rotated such that those bounding boxes are parallel to any axis.

Filter criterion (2): 'Square' objects, i.e. objects for which the width and height of the bounding box are equal, are discarded.

Filter criterion (3): Objects below a fixed area threshold, i.e. comparatively small objects, are discarded.

Figure 2D:
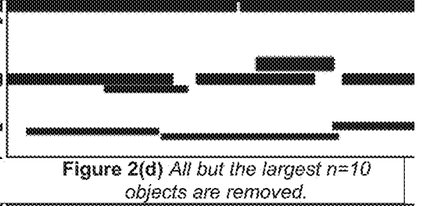

Filter criterion (4): The n largest (or smallest) objects by area are kept, while the remainder are discarded. FIG. 2(d) shows the result on the image of applying this criterion with n=10.

It is also possible to filter using any other useful and appropriate condition on any attribute or set of attributes held by the objects.

Figure 2E:
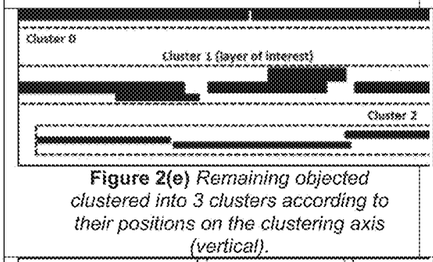

The set of objects remaining after the filtering are then sorted into clusters according to a predefined criterion. As shown in FIG. 2(e), in this example remaining objects are clustered into c clusters according to their position in a selected clustering axis, which is in this case the y-axis since the aim is to find horizontal objects (if searching for vertical objects the clustering axis would be the x axis). The position of an object may be identified by its centroid or by any other suitable point of reference. The value of c may be preset during manufacture or separately for each operation; either manually or automatically according to a set of heuristics or as the result of some machine learning process. Clusters may be ordered and labeled according to the dimension in which they were clustered. Any clustering method, e.g. k-means or agglomerative clustering, may be used.

As shown by the dashed lines in FIG. 2(e), the result of the clustering is a set of ordered clusters 0, 1 and 2, each corresponding to a different layer in the image. A known characteristic of the layer of interest is used to identify which one of the clusters corresponds to the layer of interest. In the case of the back wall, the layer of interest is expected to be the middle of the three layers, that is the layer corresponding to cluster 1. In general each layer of interest is identified by its expected index in the ordered set of clusters $[i_1, i_2, \ldots i_c]$, which may be preset during manufacture or separately for each operation; either manually or automatically according to a set of heuristics or as the result of some machine learning process.

Figure 2F:
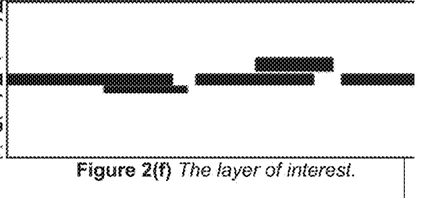
Figure 2G:
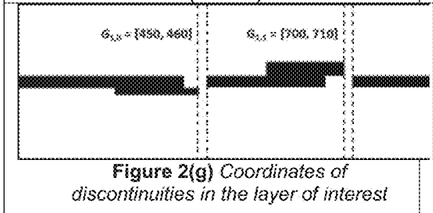

Objects belonging to clusters which do not correspond to layers of interest are discarded, as shown in FIG. 2(f).

To assist in the detection of a defect in the layer of interest, a location of a gap in the data forming the cluster identified as the layer of interest is identified as a site of a potential defect. As shown by the dashed lines in FIG. 2(g) the position of missing data, i.e. discontinuities or gaps in the layer of interest, are noted. Given a cluster C corresponding to a layer of interest, every range of values in the layer axis (i.e. the axis parallel to the layers with respect to the bounding boxes) which contains no pixels from any objects in C is added to a list $L_C = [G_{C,0}, G_{C,1}, \ldots, G_{C,g}]$, where each $G_{C,i}$ is a gap, and g is the total number of gaps. This may be repeated for every layer of interest.

Figure 2H:
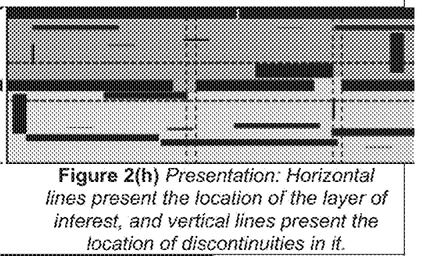

As shown in FIG. 2(h), layers of interest which have been identified may be presented to the user by drawing boundaries around the clusters of interest onto the original image or a copy of it. Boundaries may be contours, bounding boxes, or any form which presents the corresponding layer in a such a way that the user can distinguish it from other layers. Boundaries may be drawn separately for each object or for the layer as a whole. Boundaries may be drawn in any thickness, color, and may or may not be filled.

Missing data, i.e. discontinuities in a layer, may be presented by drawing any shape that encloses the corresponding range in list $L_C$, for example by drawing vertical lines either side of the gap or by drawing a circle with the centre of the range as its centroid and the length of the range as its diameter. Gap boundaries may be drawn in any thickness, color, and may or may not be filled.

The annotated image may be displayed on screen, saved to file, printed or presented by any other means or combination of means.

Figure 2I:
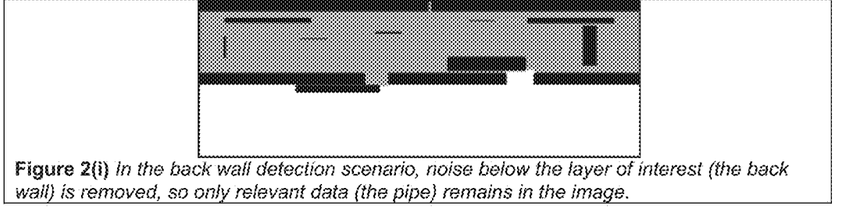

For the back wall detection problem, or any analogous scenario, noise or any other unwanted data may be identified using the locations of any layers of interest. For example, the area below a back wall in an NDT scan is not necessary for defect detection, and can therefore be discarded so that defect detection can be focussed on the relevant area, as shown in FIG. 2(i). Similar processes may be applied to any analogous scenario in which layers of interest define boundaries for unwanted data.

A specific example will now be described with reference to FIGS. 3 to 5 in which an embodiment is applied to detect a portion of interest in image data derived from an item using ultrasonic NDT.

Figure 3:
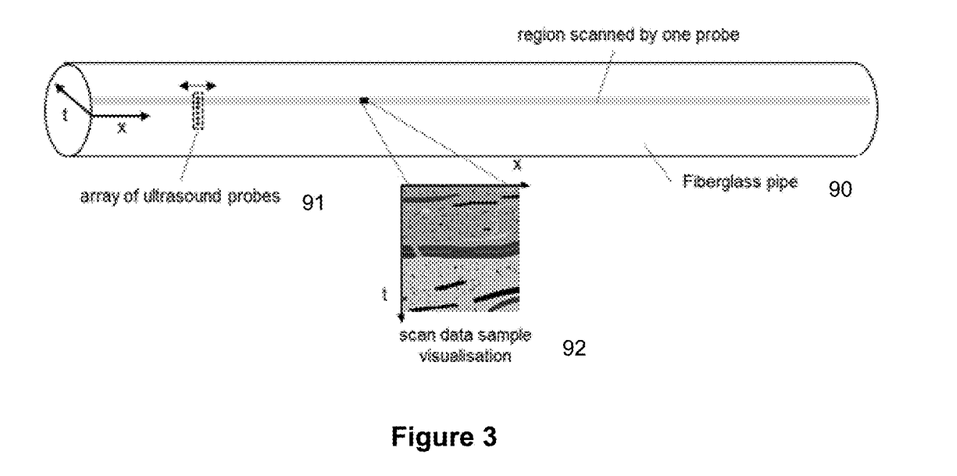
FIG. 3 is a diagram for use in explaining an application of an embodiment to analysis of a pipe structure.

For example purposes, we consider a fiberglass pipe 90 as the test item, as shown in FIG. 3. Fiberglass is widely used in manufacturing of large structures that benefit from being light weight, while having high strength and durability properties. Early applications of fiberglass came from the aviation and aerospace industries for aircraft design. Nowadays, there are many other applications including ship hulls, pipes, surfboards, wind turbine blades, automobile body parts, water slides, pole vaulting poles, among others. Any manufacturing anomalies in such objects may have a significant impact on their structural integrity.

Ultrasonic NDT scanning is performed by an array of probes 91, which emit sound waves that propagate inside the pipe structure 90 and receive the echoes resulting from interactions with its front and back walls (FIG. 3). The amplitude of the echoes is measured along two dimensions, length x which is measured in a direction parallel to the length of the pipe 90, and time t. The resulting data may be represented as a numerical matrix with echo amplitudes, where each row i corresponds to a given propagation time $t_i$ and each column j corresponds to a given horizontal position xj. As mentioned above, the raw data matrix may be visualized (for example, by mapping a color gradient to the amplitude values of the echoes (e.g. a gradient from deep blue to dark red), as shown in scan data sample visualization 92.

Figure 4:
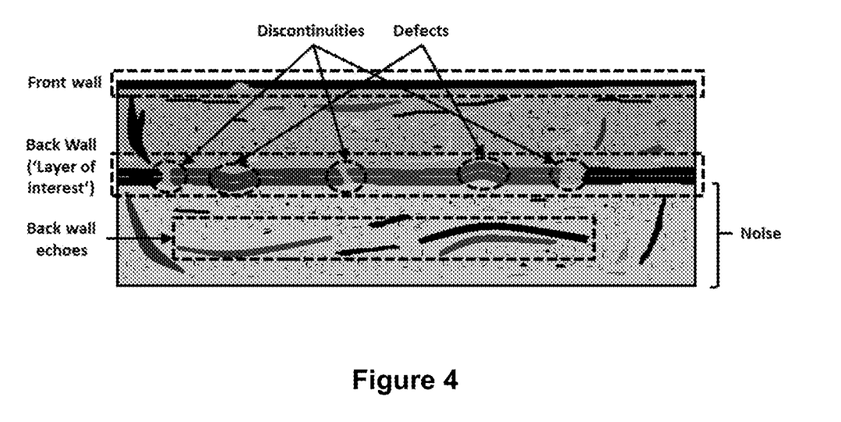
FIG. 4 is a diagram depicting an image of ultrasound scan data obtained from scanning the structure of FIG. 3.

As shown in FIG. 4, the front and back structures of the test object are easily identifiable in the visualization, since the amplitudes of the echoes they produce usually stand out as dark colored regions, hence making it easy to inspect for defects. Defects such as wrinkles in the fiberglass layers bring about distinct visual patterns in the scan, such as discontinuities or curvatures in the back structure region.

The data visualized below the back wall structure constitutes noise and is thus irrelevant for the inspection process; therefore identification of the back wall is important. For this reason, the back wall is considered to be the 'layer of interest' to be detected automatically by the system, and to have its discontinuities, i.e. gaps, identified.

In the example above, the system is configured to cluster the largest 10 horizontal red objects into three horizontal layers, with clusters indexed by ascending position in the t-axis so that the top cluster takes the index 0 and corresponds to the front wall, the middle cluster takes the index 1 and corresponds to the back wall, and the bottom cluster takes the index 2 and corresponds to the back wall echoes. The process for identifying the layer of interest and any gaps in it will now be explained with reference to FIG. 5.

Figures 5A, 5J:
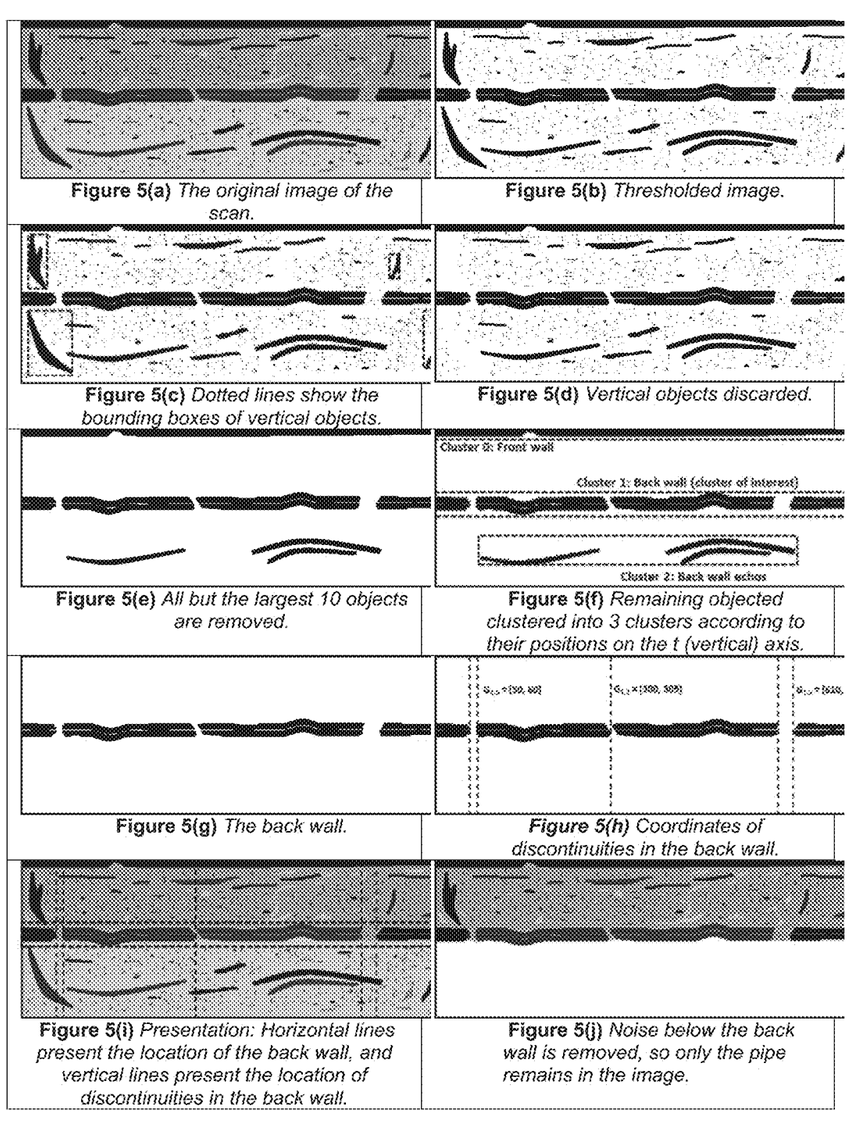

FIG. 5(a) shows an image of the entire scan as presented at the start of the process. The image was generated from raw scan data represented in a matrix.

The image is first "thresholded" (i.e. the image data is compared to a threshold) according to a three-dimensional threshold [a,b,c], set such that pixels must satisfy R>a, G<(R−b), B<(G−c). For example, a threshold [0, 50, 50] is set so that pixels satisfy R>0, G<(R−50), B<(G−50), thus permitting various degrees of 'redness' that may even include some shades of orange or even yellow.

The result is a binary image as shown in FIG. 5(b) in which regions satisfying the threshold appear as black objects, and empty space appears white.

The contours and areas of all objects in the image are then found by using the 'findContours' and 'contourArea' functions of the OpenCV2 python library.

Filters are then applied to remove some objects from the image. In particular, objects are discarded if they satisfy the following conditions, in the given order:

- Vertical objects, i.e. objects parallel to the clustering axis t with respect to the bounding boxes of those objects. FIG. 5(c) shows dotted lines denoting the bounding boxes of vertical objects, and FIG. 5(d) shows the image with these objects removed.
- Any object that is not among the n=10 largest objects. FIG. 5(e) shows the image where only the ten largest objects remain.

The ten remaining objects in the image are then clustered into three clusters according to the position of their centroid in the clustering axis t, as shown in FIG. 5(f). These three clusters are ordered by ascending position in the t-axis so that the top cluster takes the index 0 and is thus classified as the front wall, the middle cluster takes the index 1 and is classified as the back wall, and the bottom cluster takes the index 2 and is classified as the back wall echoes. All layers have been correctly classified, in particular the layer of interest (index 1), i.e. the back wall the user is searching for. Clusters which do not correspond to the layer of interest are removed, as shown in FIG. 5(g).

In this case the user also wishes to identify gaps in the back wall. Every range of values in the x-axis (the layer axis) which contains no pixels from any objects in the cluster corresponding to the layer of interest, as shown in FIG. 5(h), is added to a list $L_1=[G_{1,0}, G_{1,1}, G_{1,2}]=[[50, 60], [300, 305], [610, 630]]$.

The location of the back wall, and its gaps, are presented to the user, as shown in FIG. 5(i). A box is drawn around the back wall, and vertical lines are drawn on either side of each gap.

In this example, the purpose of back wall detection is to remove the noise below it, so only the pipe remains in the image as shown in FIG. 5(j), and further defect detection may be focussed on this area.

Embodiments are not limited to use with ultrasound scan images or non-destructive testing (NDT) image data, and may be applied to any matrix of data containing layer, wall, boundary or similar structures, regardless of whether that matrix is represented as an image. Furthermore, embodiments are not limited to use with fiberglass structures and may be applied to items or structures of any material or type.

For example, embodiments may be used in the field of geology, e.g. for automatically detecting strata which exhibit certain properties, and/or identifying discontinuities in those strata.

Embodiments may be applied to any image which has a dominant large object that needs to be detected and segmented. For example, a CCTV camera capturing footage from a motorway may include images from both the motorway lanes and the hard shoulder. In some applications, one may want to detect cars driving illegally on the hard shoulder. In another application, one may want to reduce the size of the image data file by eliminating irrelevant parts of the image, for example where cars are not present. An embodiment may be applied to segment the white line that separates the main road from the hard shoulder, regardless of any break in the line due to occlusions or wear in the paint. As a more generalized example, the amount of stored image or matrix data derived from an item under consideration may be reduced by identifying the portion of interest and then, in accordance with the location of the identified portion of interest, eliminating the part of the stored data which is no longer relevant.

Embodiments may be implemented in hardware, or as software modules running on one or more processors, or on a combination thereof. That is, those skilled in the art will appreciate that a microprocessor or digital signal processor (DSP) may be used in practice to implement some or all of the functionality described above.

Embodiments may also be one or more device or apparatus programs (e.g. computer programs and computer program products) for carrying out part or all of the methods described herein. Such programs may be stored on computer-readable media, or could, for example, be in the form of one or more signals. Such signals may be data signals downloadable from an Internet website, or provided on a carrier signal, or in any other form.

Figure 6:
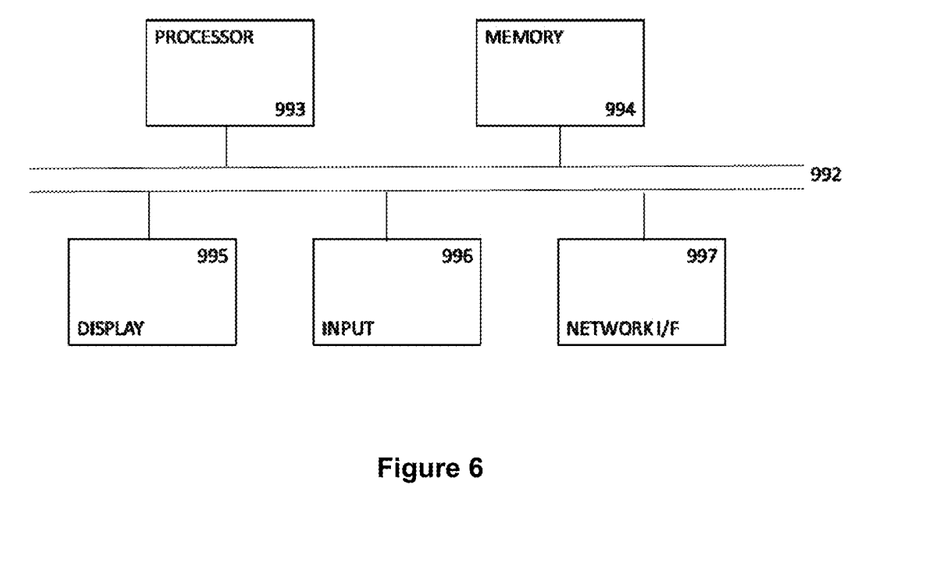
FIG. 6 is a block diagram of a computing device for carrying out steps of a method, and performing tasks of apparatus, of an embodiment.

FIG. 6 is a block diagram of a computing device, such as a data storage server, which may be used to implement some or all of the steps of a method, and perform some or all of the tasks of apparatus, of an embodiment. For example, the computing device of FIG. 6 may be used to implement all the steps of the method illustrated in FIG. 1(a), and perform all the tasks of the apparatus 10 shown in FIG. 1(b), or only to implement some of the steps in the method of FIG. 1(a) and only to perform some of the tasks of the apparatus 10 shown in FIG. 1(b).

The computing device comprises a processor 993, and memory, 994. Optionally, the computing device also includes a network interface 997 for communication with other such computing devices, for example with other computing devices.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a non-transitory computer-readable storage medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIGS. 1(a), 2(a) to 2(i) and 5(a) to 5(i) and defined in the claims. For example, such computer program code may implement at least one of: the part identifier 1, one or more filters 2, sorter 3, cluster identifier 4 and gap identifier 5 depicted in FIG. 1(b) and described earlier. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 995 may display a representation of data stored by the computing device and may also display a cursor and dialog boxes and screens enabling interaction between a user and the programs and data stored on the computing device and may also display the portion of interest having the defect to a user. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball, etc. may be included in the computing device.

Methods may be carried out on a computing device such as that illustrated in FIG. 6. Such a computing device need not have every component illustrated in FIG. 6, and may be composed of a subset of those components. A method may be carried out by a single computing device in communication with one or more data storage servers via a network. The computing device may be a data storage itself storing at least a portion of the data.

A method may be carried out by a plurality of computing devices operating in cooperation with one another. One or more of the plurality of computing devices may be a data storage server storing at least a portion of the data.

The above-described embodiments may advantageously be used independently of any other of the embodiments or in any feasible combination with one or more others of the embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A computer-implemented method of automatically locating a portion of interest in one of an image and matrix data, derived from an item under consideration, comprising:
    identifying parts of the one of the image and the matrix data that satisfy a preset threshold as identified objects possibly included in the portion of interest, the portion of interest corresponding to one of a layer and a boundary, and one of representing and forming part of the item under consideration;
    applying at least one preselected filter to the one of the image and the matrix data corresponding to the identified objects to find a set of interesting objects most likely to be part of the portion of interest, the preselected filter filtering out the identified objects having a major axis in a direction perpendicular to an expected orientation of the one of the layer and the boundary;
    sorting the interesting objects in the set into clusters according to a predefined criterion; and
    identifying, in the one of the image and the matrix data based on a known characteristic of the portion of interest, one of the clusters as corresponding to the portion of interest.

2. A method as claimed in claim 1, wherein, for image data, the preset threshold comprises a pixel value for at least one color, and pixel data of the image which exceed the pixel value are included in the identified objects.

3. A method as claimed in claim 1, wherein the predefined criterion for sorting the interesting objects in the set is position in the direction perpendicular to the expected orientation of the one of the layer and the boundary.

4. A method as claimed in claim 1, further comprising, generating an image from the matrix data excluding cluster data of at least one cluster not identified as corresponding to the portion of interest.

5. A method as claimed in claim 1, further comprising, removing from the image, image data of at least one cluster not identified as corresponding to the portion of interest.

6. A method as claimed in claim 1, wherein the one of the image and matrix data is derived from ultrasound scan data of the item under consideration.

7. A method as claimed in claim 1, wherein the item under consideration is at least one of: a manufactured item; and an item used in manufacture.

8. A defect detection method for use in detecting a defect in an item under consideration, comprising:
    analyzing one of an image of the item and an image derived from the item, to identify the defect; and
    obtaining image data for the analyzing in which a portion of interest has been automatically located in accordance with the method of claim 1.

9. A method as claimed in claim 8, comprising identifying, as a site of a potential defect, a location of a gap in the data forming the cluster identified as corresponding to the portion of interest.

10. A method as claimed in claim 8, wherein the item under consideration is at least one of: a manufactured item; and an item used in manufacture.

11. A method as claimed in claim 8, further comprising determining at least one of: structural integrity of material forming at least part of the item; and flaws in material forming at least part of the item.

12. A non-transitory computer-readable storage medium carrying instructions which, when run on a computer, causes that computer to carry out a method as claimed in claim 1.

13. A method as claimed in claim 1, further comprising, after identifying the portion of interest, analyzing the portion of interest to identify a defect in the item under consideration.

14. A method as claimed in claim 8, further comprising presenting the portion of interest having the defect to a user.

15. A method as claimed in claim 1, wherein the one of the image and matrix data is stored, and the method further comprises, after identifying the portion of interest, reducing a stored amount of the one of the image and matrix data by eliminating part of the data in accordance with a location of the identified portion of interest.

16. A data processing apparatus to locate a portion of interest in one of image and matrix data, derived from an item under consideration, the apparatus comprising:
    a processor; and
    a memory storing instructions that when executed by the processor
        identify parts of the one of the image and the matrix data that satisfy a preset threshold as identified objects possibly included in the portion of interest, the portion of interest corresponding to one of a layer and a boundary, and one of representing and forming part of the item under consideration, apply at least one preselected filter to the one of the image and the matrix data corresponding to the identified objects to find a set of interesting objects most likely to be part of the portion of interest, the preselected filter filtering out the identified objects having a major axis in a direction perpendicular to an expected orientation of the one of the layer and the boundary, sort the interesting objects in the set into clusters according to a predefined criterion, and identify, in the one of the image and the matrix data based on a known characteristic of the portion of interest, one of the clusters as corresponding to the portion of interest.

17. An apparatus as claimed in claim 16, wherein the instructions further include to identify, as a site of a potential defect, a location of a gap in cluster data forming the cluster identified as corresponding to the portion of interest.

18. An apparatus as claimed in claim 16, further comprising a display to display the portion of interest.

19. A data processing apparatus as claimed in claim 16, wherein the predefined criterion for sorting objects is a position in the direction perpendicular to the expected orientation of the one of the layer and the boundary.

20. A computer-implemented method of automatically locating a portion of interest in one of an image and matrix data, derived from an item under consideration, comprising:

identifying parts of the one of the image and the matrix data that satisfy a preset threshold as identified objects possibly included in the portion of interest, the portion of interest corresponding to one of a layer and a boundary, and one of representing and forming part of the item under consideration;

applying at least one preselected filter to the one of the image and the matrix data corresponding to the identified objects to find a set of interesting objects most likely to be part of the portion of interest, the preselected filter filtering out the identified objects having a major axis in a direction perpendicular to an expected orientation of the one of the layer and the boundary;

sorting the interesting objects in the set into clusters according to a position in the direction perpendicular to the expected orientation of the one of the layer and the boundary; and identifying, in the one of the image and the matrix data based on a known characteristic of the portion of interest, one of the clusters as corresponding to the portion of interest.

21. A method as claimed in claim 20, wherein, for image data, the preset threshold comprises a pixel value for at least one color, and pixel data of the image which exceed the pixel value are included in the identified objects.

* * * * *